(12) United States Patent
Clarke et al.

(10) Patent No.: US 7,658,546 B2
(45) Date of Patent: Feb. 9, 2010

(54) BEARING ASSEMBLY

(75) Inventors: Allen Clarke, Lincoln (GB); Paul R. Smith, Lincoln (GB)

(73) Assignee: Minebea Co. Ltd., Nagano (JP)

( * ) Notice: Subject to any disclaimer, the term of this patent is extended or adjusted under 35 U.S.C. 154(b) by 588 days.

(21) Appl. No.: 11/243,414

(22) Filed: Oct. 4, 2005

(65) Prior Publication Data
US 2006/0098908 A1 May 11, 2006

(30) Foreign Application Priority Data
Oct. 6, 2004 (GB) .................. 0422182.6

(51) Int. Cl.
F16C 23/04 (2006.01)
F16C 33/74 (2006.01)
F16C 27/06 (2006.01)

(52) U.S. Cl. .................. 384/192; 384/203; 384/206

(58) Field of Classification Search .......... 384/192, 384/202–203, 208, 212, 215, 220; 403/120, 403/140, 203, 221, 228, 269; 267/140.2, 267/140.5, 141.3, 153, 182
See application file for complete search history.

(56) References Cited

U.S. PATENT DOCUMENTS

| | | | | |
|---|---|---|---|---|
| 2,488,775 A * | 11/1949 | Heim | .................. | 384/214 |
| 2,804,679 A | 9/1957 | Tracy | | |
| 2,856,203 A * | 10/1958 | Kayler | .................. | 384/215 |
| 3,162,930 A * | 12/1964 | Litsky | .................. | 384/192 |
| 3,193,910 A | 7/1965 | Evans | .................. | 29/898.047 |
| 3,583,775 A * | 6/1971 | Potter et al. | .................. | 384/208 |
| 3,754,802 A * | 8/1973 | Keller | .................. | 384/203 |
| 4,034,996 A * | 7/1977 | Manita et al. | .................. | 403/228 |
| 4,129,394 A * | 12/1978 | Eichinger et al. | .................. | 403/57 |
| 4,259,027 A | 3/1981 | Hata | | |
| 4,844,627 A * | 7/1989 | Speakman | .................. | 384/208 |
| 5,033,722 A * | 7/1991 | Lammers | .................. | 403/133 |
| 5,058,867 A * | 10/1991 | Hadano et al. | .................. | 267/141.3 |
| 5,178,482 A | 1/1993 | Wood | | |
| 5,364,191 A * | 11/1994 | Gruber | .................. | 384/203 |
| 5,902,050 A * | 5/1999 | Balczun et al. | .................. | 384/203 |
| 6,062,098 A * | 5/2000 | Spalthoff | .................. | 384/202 |
| 7,017,890 B2 * | 3/2006 | Rechtien | .................. | 267/141.5 |

FOREIGN PATENT DOCUMENTS

DE 4240099 C1 5/1994

(Continued)

OTHER PUBLICATIONS

European Patent Application No. EP05021644; Applicant: Minebea Co., Ltd., Nov. 13, 2007, European Patent Office, 8 pgs.

Primary Examiner—Marcus Charles
(74) Attorney, Agent, or Firm—Perkins Coie LLP

(57) ABSTRACT

A bearing assembly comprising a housing and a ball at least partially housed within the housing. The housing comprises a race having a concave bearing surface, a sleeve surrounding the race, and a resilient member disposed between the race and the sleeve. The surfaces of the race and sleeve adjacent the resilient member and the surfaces of the resilient member preferably include at least one pair of a co-operating protrusion and recess. Alternatively, or additionally, the surfaces of the race and the sleeve adjacent the resilient member have different curvatures.

25 Claims, 4 Drawing Sheets

FOREIGN PATENT DOCUMENTS

| | | |
|---|---|---|
| DE | 10124843 | 11/2002 |
| EP | 72666 A1 * | 2/1983 |
| EP | 0552937 A1 | 7/1993 |
| EP | 0779442 A1 | 6/1997 |
| EP | 0 781932 A1 * | 7/1997 |
| EP | 0971138 A2 | 1/2000 |
| EP | 1338810 | 8/2003 |
| GB | 600265 | 4/1948 |
| GB | 2106173 | 9/1981 |
| GB | 2106173 A | 9/1981 |
| GB | 2103757 A * | 2/1983 |
| GB | 2263948 A * | 8/1993 |
| JP | 52024658 A * | 2/1977 |
| JP | DE 4138609 A1 * | 5/1993 |
| JP | 2002-276652 | 9/2002 |

\* cited by examiner

//BEARING ASSEMBLY

CROSS REFERENCE OF RELATED APPLICATION

The present application claims priority of United Kingdom Patent Application Serial No. GB0422182.6, filed on 6 Oct. 2004, the disclosure of which is incorporated herein by reference in its entirety.

BACKGROUND

The present invention relates to a bearing assembly and in particular to a spherical bearing assembly.

FIG. 1 illustrates a known type of spherical bearing 1 comprising a housing 2 and a ball 3 partially housed within the housing 2. The housing 2 comprises a race 4 having a spherical bearing surface 7, a sleeve 5 surrounding the race 4, and an elastomer 6 disposed between and bonded to the race 4 and sleeve 5. The race 4 and sleeve 5 are arranged coaxially about a central axis of the housing 2. The ball 3 is mounted within the race 4 such that the ball 3 is free to rotate but is prevented from any significant translational movement within the race 4.

The elastomer 6 serves to absorb displacement of the ball 3 relative to the housing 2 in a radial direction, i.e. in a direction normal to the central axis of the housing 2. As a result, the bearing assembly 1 is able to dampen radial vibrations as well as compensate for minor misalignments in the objects to which the bearing assembly 1 is mounted.

A problem with the bearing assembly 1 of FIG. 1 is that it is ill-equipped at accommodating forces which act on the ball 3 in a direction parallel to the central axis of the housing 2, referred to hereafter as axial forces. Axial forces acting on the ball 3 cause the ball 3 to be displaced axially relative to the housing 2, i.e. in a direction parallel to the central axis. Owing to the engagement of the race 4 with the ball 3, axial displacement of the ball 3 causes the race 4 to be displaced in the same direction. This displacement of the race 4 relative to the sleeve 5 creates shearing forces between the race 4 and sleeve 5. Consequently, repeated or excessive axial displacement of the race 4 relative to the sleeve 5 can lead to one or both of the race:elastomer and sleeve:elastomer interfaces shearing with the subsequent separation of the elastomer 6 from the race 4 and/or sleeve 5. When this occurs, the ball 2 and race 4 are free to separate from the sleeve 5 resulting in failure of the bearing 1.

There is a threshold torque between the ball 3 and housing 2 below which there is no resultant movement of the ball 3 relative to the housing 2. Above the threshold torque, the ball 3 is caused to rotate within the housing 2. The bearing assembly 1 of FIG. 1 is poorly-equipped at accommodating rotational forces below the threshold torque which may act on the bearing assembly 1, i.e. forces which cause the ball 3 to rotate within the housing 2. Owing to frictional forces which act between the ball 3 and race 4, rotation of the ball 3 within the race 4 encourages the race 4 to similarly rotate. This is particularly true when the bearing 1 is secured to a body by interference fit, which results in the housing 2 being radially compressed. Any rotation of the race 4 relative to the sleeve 5 will again create shearing forces. Consequently, although the bearing 1 is designed to facilitate rotation of the ball 3 within the housing 2, the bearing 1 is susceptible to failure with repeated rotation of the ball 3 below the threshold torque, due to shearing of the race:elastomer and/or sleeve:elastomer interfaces.

The present invention provides a bearing assembly that overcomes one or more of the aforementioned disadvantages of the aforementioned design by more effectively accommodating axial and/or rotational forces.

SUMMARY

Accordingly, in a first aspect, the present invention provides a bearing assembly comprising a housing and a ball at least partially housed within the housing, the housing comprising a race having a concave bearing surface and receiving at least a portion of the ball, a sleeve surrounding the race, and a resilient member disposed between the race and the sleeve, wherein the surfaces of the race and sleeve adjacent the resilient member and the surfaces of the resilient member include at least one pair of a co-operating protrusion and recess.

Preferably, the at least one protrusion and recess co-operate such that the resilient member is compressed upon rotating the race relative to the sleeve.

More preferably, the race and sleeve are arranged coaxially about a central axis and the at least one protrusion and recess co-operate such that the resilient member is compressed upon rotating the race relative to the sleeve about the central axis.

Advantageously, at least one co-operating protrusion and recess are annular.

Conveniently, each protrusion and recess has a curved profile.

Preferably, the resilient member is of uniform thickness and the surface of the race adjacent the resilient member includes one or more protrusions and recesses and the surface of the sleeve adjacent the resilient member includes one or more co-operating recesses or protrusions.

Conveniently, the surfaces of the race and sleeve adjacent the resilient member are respectively convex and concave.

Advantageously, the surfaces of the race and sleeve adjacent the resilient member have different curvatures or ellipticities.

Preferably, at least one of the surfaces of the race and sleeve adjacent the resilient member is rippled.

Advantageously, the surfaces of the race and sleeve adjacent the resilient member include at least one pair of a protrusion and protrusion or protrusion and recess which engage with one another upon displacement of the race relative to the sleeve so as to prevent any further displacement of the race relative to the sleeve.

In a second aspect, the present invention provides a bearing assembly comprising a housing and a ball at least partially housed within the housing, the housing comprising a race having a concave bearing surface and receiving at least a portion of the ball, a sleeve surrounding the race, and a resilient member disposed between the race and the sleeve, wherein the surfaces of the race and the sleeve adjacent the resilient member have different curvatures.

Conveniently, one of the surfaces of the race and the sleeve adjacent the resilient member is a flat annular surface.

Alternatively, the surfaces of the race and sleeve adjacent the resilient member are respectively convex and concave.

Preferably, at least one of the surfaces of the race and sleeve adjacent the resilient member has a non-spherical curvature, i.e. a non-zero ellipticity.

Advantageously, the thickness of the resilient member is non-uniform.

Preferably, the resilient member is thicker at the centre of the housing than at the ends of the housing.

Alternatively, the resilient member is thicker at the ends of the housing than at the centre of the housing.

Conveniently, the surfaces of the race and sleeve adjacent the resilient member and the surfaces of the resilient member include at least one pair of a co-operating protrusion and recess.

Advantageously, the ball and the bearing surface of the race are spherical.

Conveniently, the ball includes one or more arms.

Alternatively, the ball includes a bore.

Advantageously a self-lubricating liner is provided between the race and ball.

In a third aspect, the present invention provides a method of manufacturing a bearing assembly comprising the steps of: providing a ball; surrounding the ball with a race having a concave bearing surface; surrounding the race with a sleeve; and providing a resilient member between the race and the sleeve, wherein the surfaces of the race and sleeve adjacent the resilient member and the surfaces of the resilient member include at least one pair of a co-operating protrusion and recess.

Preferably the step of surrounding the ball with a race comprises swaging the race onto the ball.

Advantageously the steps of surrounding the race with a sleeve and providing a resilient member between the race and sleeve comprises surrounding the race with the resilient member and swaging the sleeve over the resilient member.

Conveniently, the step of providing the resilient member includes moulding an elastomer onto the race by an injection process.

Preferably, the elastomer is additionally moulded onto the sleeve.

In order that the invention may be more readily understood, and so that further features thereof may be appreciated, the embodiments of the invention will now be described, by way of example, with reference to the accompanying drawings in which:

DETAILED DESCRIPTION

Figure 2:
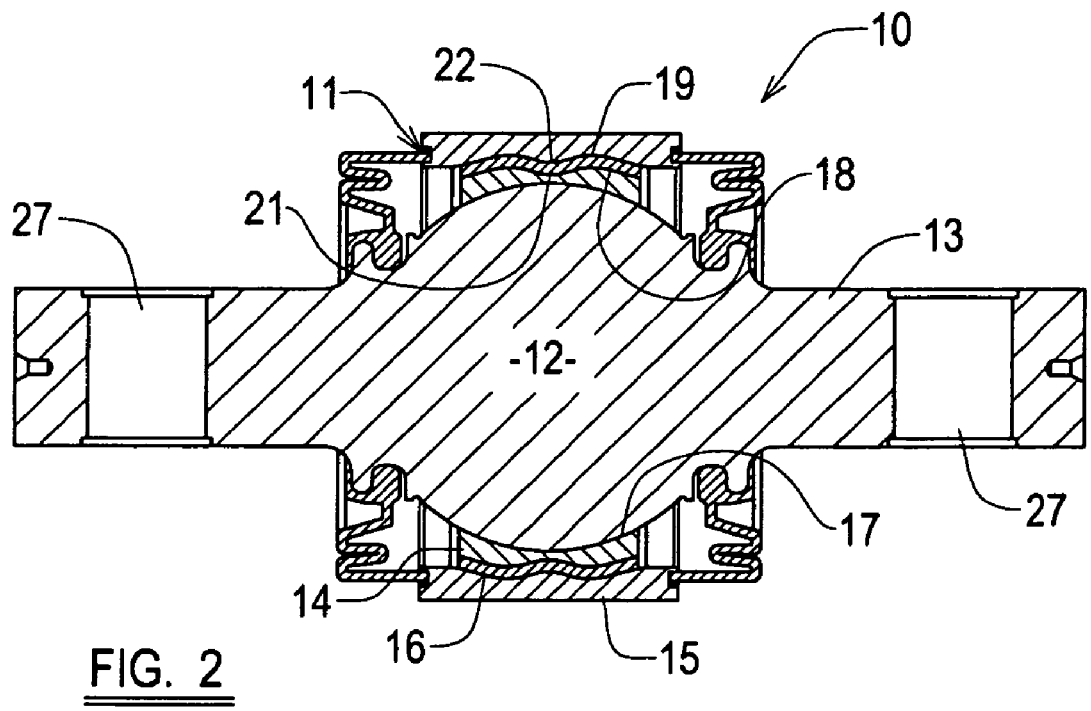
FIG. 2 is a cross-sectional view of a bearing assembly in accordance with a first embodiment of the present invention.

The bearing assembly 10 of FIG. 2 comprises a housing 11 within which a ball 12 is partially housed and rotatably mounted.

Figure 5:
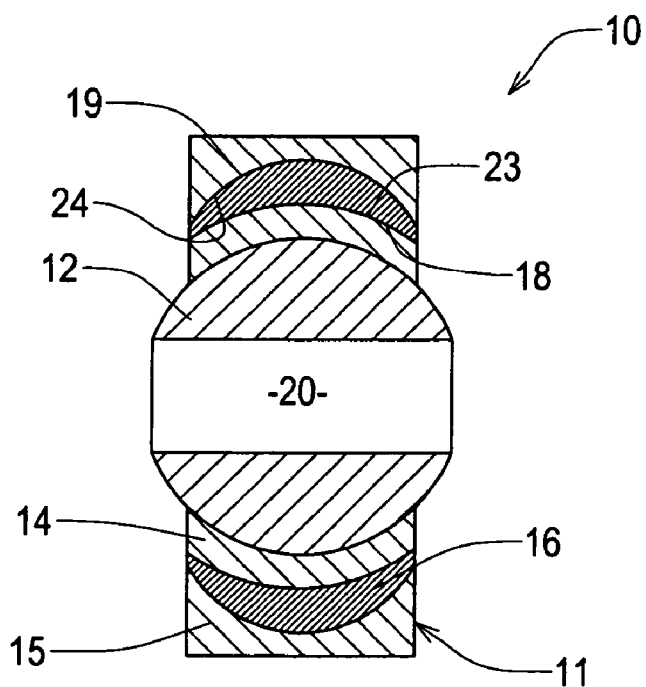
FIG. 5 is a cross-sectional view of a bearing assembly in accordance with a third embodiment of the present invention.

The ball 12 is preferably spherical. However, as is noted below, the shape of the ball 12 may alternatively be spheroid. The ball 12 of the bearing assembly 10 illustrated in FIG. 2 is a complete sphere. However, only the portion of the ball 12 which engages with (i.e. contacts) the housing 11 need be spherical. Consequently the ball 12 may alternatively be an incomplete sphere or spheroid, as illustrated in FIGS. 3 and 5.

The ball 12 is attached to a pair of arms 13, each arm extending on opposite sides of the ball 12 in a direction away from the housing 11. The ball 12 and arms 13 are preferably integral so as to form a single element. The arms 13 serve to mount the bearing assembly 10 to other components and may be provided, for example, with a screw thread 26 or bore 27.

Figure 3:
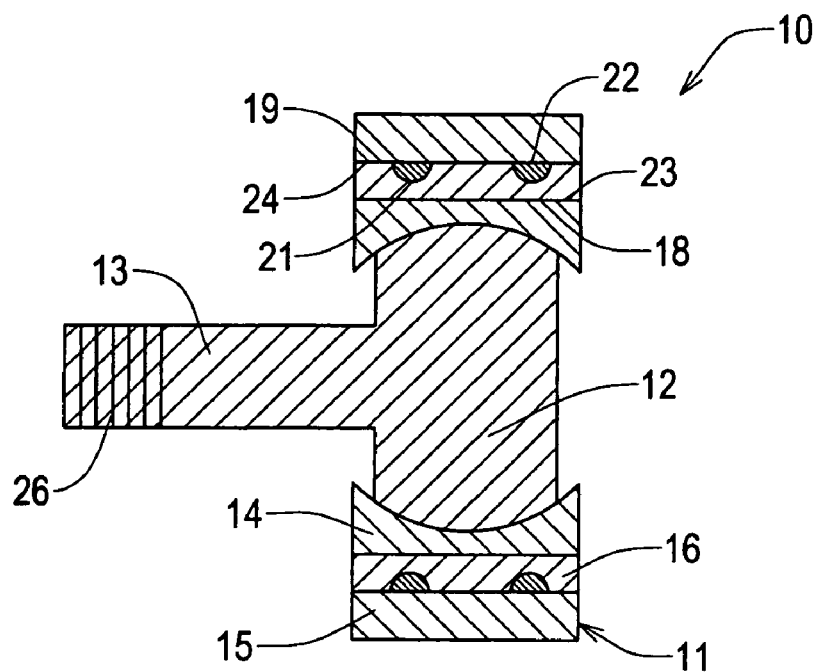
FIG. 3 is a cross-sectional view of a bearing assembly in accordance with a second embodiment of the present invention.

Rather than a pair of arms 13, the ball 12 may instead be attached to a single arm 13, as illustrated in the embodiment of FIG. 3. Alternatively, as illustrated in FIG. 5, the ball 12 may have no attaching arms and instead include a bore 20 for receiving a shaft, axle or the like.

The housing 11 comprises a race 14 having a concave bearing surface 17, a sleeve 15 arranged about the race 14 and a resilient member 16 disposed between the race 14 and the sleeve 15. The race 14 and sleeve 15 are arranged coaxially about a central axis of the housing 11.

The ball 12 is mounted within the race 14 such that the ball 12 is free to rotate in at least one direction (and preferably in all directions) within the race 14. The shape or curvature of the bearing surface 17 of the race 14 preferably conforms to that of the ball 12. Moreover, both the ball 12 and the bearing surface 17 of the race 14 are preferably spherical. That is to say, the bearing surface 17 and the portion of the ball 12 mounted within the race 14 have spherical curvatures. In employing a spherical ball 12 and bearing surface 17, the ball 12 is free to rotate in all directions within the race 14. Nevertheless, there may be instances for which a non-spherical ball 12 and bearing surface 17 (e.g. an oblate or prolate spheroid) may be desired, e.g. to inhibit rotation of the ball 12 in a particular direction.

The diameter of the bearing surface 17 is preferably only slightly greater than that of the ball 12 such that rotation of the ball 12 is permitted whilst any significant translational movement of the ball 12 within the race 14 is prevented.

The resilient member 16 preferably extends completely around the outermost surface 18 of the race 14 so as to form a collar between the race 14 and sleeve 15. Additionally, the resilient member 16 is preferably made of an elastomeric material, such as rubber. However, other means of providing resilience, such as a sealed fluid, may alternatively be used.

The outermost surface 18 of the race 14 adjacent the resilient member 16 is convex and the innermost surface 19 of the sleeve 15 adjacent the resilient member 16 is concave. The surfaces 18, 19 of the race 14 and sleeve 15 adjacent the resilient member 16 have corresponding profiles. That is to say, the degrees of curvature or ellipticities of the surfaces 18, 19 are the same.

Owing to the curved surfaces 18, 19 of the race 14 and sleeve 15 adjacent the resilient member 16, the resilient member 16 is compressed whenever the race 14 and sleeve 15 move relative to one another in an axial direction, i.e. in a direction parallel to the central axis of housing 11. Moreover, as the race 14 and sleeve 15 are further displaced axially relative to one another, the resilient member 16 is further compressed. Consequently, the bearing assembly 10 is well-equipped at absorbing axial forces which act upon the bearing assembly, i.e. which cause the ball 12 to be displaced relative to the housing 11 in a direction towards an open end of the race 14. Moreover, the bearing assembly 10 is particularly well-suited at resisting excessive axial forces which would otherwise cause the elastomer interfaces of the spherical bearing 1 of FIG. 1 to shear.

The outermost surface 18 of the race 14 adjacent the resilient member 16 includes an annular recess or groove 21 and the innermost surface 19 of the sleeve 15 adjacent the resilient member 16 includes an annular protrusion 22. The recess 21 and protrusion 22 are aligned and co-operate such that the resilient member 16 is received in the recess 21 and additionally surrounds the protrusion 22.

As a result of the resilient member 16 being received by the recess 21, any motion of the race 14 relative to the resilient member 16 causes the resilient member to be compressed. The only exception to this is when the race 14 is rotated relative to the resilient member 16 about the same axis as that defining the annular recess 21, which in the embodiment illustrated in FIG. 2 is coincident with the central axis of the housing 11. Additionally, as the resilient member 16 surrounds the protrusion 22, any motion of the sleeve 15 relative to the resilient member 16 causes the resilient member 16 to be compressed; again, with the same exception. Consequently, whenever the race 14 and sleeve 15 are displaced relative to one another, the co-operating recess 21 and protrusion 22 cause the resilient member 16 to be compressed. Moreover, as the race 14 is further displaced relative to the sleeve 15, compression of the resilient member 16 by the co-operating recess 21 and protrusion 22 increases.

The recess 21 and protrusion 22 therefore co-operate to resist forces acting upon the bearing assembly 10. For example, when axial forces act upon the ball 12, the race 14 is displaced axially relative to the sleeve 15. The co-operating recess 21 and protrusion 22 then cause the resilient member 16 to be compressed so as to provide increasing resistance to axial displacement of the race 14 relative to the sleeve 15. In this manner, the resilient member 16 and the co-operating recess 21 and protrusion 22 act to dampen axial forces and resist excessive axial forces which would otherwise cause the interfaces of the resilient member 16 with the race 14 and/or sleeve 15 to shear.

The co-operating recess 21 and protrusion 22 additionally serve to absorb rotational forces which act between the ball 12 and the housing 11. Owing to frictional forces which act between the ball 12 and the bearing surface 17 of the race 14, the race 14 experiences a force whenever the ball 12 rotates within the race 14. This is particularly true when the bearing assembly 10 is secured to a body by interference fit. Owing to the radial compression of the housing 11 that results from an interference fit, the race 14 is generally compressed onto the ball 12. Consequently, the frictional forces between the ball 12 and race 14 can be considerable. As the ball 12 rotates within the race 14, the race 14 experiences a displacement in the direction of rotation of the ball 12. This displacement of the race 14 relative to the sleeve 13 creates a shearing force, which can result in the interface of the resilient member 16 with the race 14 and/or sleeve 15 failing. This is particularly true when the outermost surface 18 of the race 14 and/or the innermost surface 19 of the sleeve 15 are spherically curved.

In having a co-operating recess 21 and protrusion 22 on the interface surfaces 18, 19 of the race 14 and sleeve 15 adjacent the resilient member 16, the resilient member 16 is compressed whenever the race 14 is rotated relative to the sleeve 15. Accordingly, the bearing assembly 10 is able to accommodate not only radial and axial forces, but also rotational forces.

As the recess 21 and protrusion 22 are annular, the resilient member 16 is not compressed whenever the race 14 and sleeve 15 are rotated relative to one another about the axis that defines the annular recess 21. This may be addressed by having a non-annular recess and protrusion. Alternatively, more than one pair of protrusions and recesses may be provided on the interface surfaces 18, 19 of the race 14 and sleeve 15. Indeed, the surfaces 18, 19 may be provided with various forms of protrusions and co-operating recesses. For example, the protrusion 22 and recess 12 may be in the form of a spiral from one open end of the bearing surface 17 to the other, a plurality of dimples and bumps, or the surfaces 18,19 may be rippled to provide a wavy profile.

Whilst reference has been made to a recess 21 in the outermost surface 18 of the race 14 and a protrusion 22 in the innermost surface 19 of the sleeve 15, it will be appreciated that the same technical effect is achieved when the recess 21 is formed instead in the surface 19 of the sleeve 15 and the protrusion 22 is formed in the surface 18 of the race 14. Indeed, where more than one co-operating pair of protrusions and recesses are employed, each surface 18, 19 of the race 14 and sleeve 15 may include both protrusions and recesses.

The profile of each protrusion and recess is preferably smooth, i.e. devoid of any sharp corners. This then simplifies the manufacture and assembly of the housing 11, as described below.

The resilient member 16 is preferably bonded to both the race 14 and sleeve 15. However, as the protrusions 22 and recesses 21 serve to retain the resilient member 16 in position, the resilient member 16 need not necessarily be bonded to either the race 14 or sleeve 15.

As already noted, the surfaces 18, 19 of the race 14 and sleeve 15 adjacent the resilient member 16 are preferably curved such that the resilient member 16 is compressed whenever the race 14 and sleeve 15 move relative to one another in an axial direction. Although reference has been made to the surfaces 18, 19 of the race 14 and sleeve 15 having respectively convex and concave profiles, it will of course be apparent that the surfaces 18, 19 may alternatively have respective concave and convex profiles. Moreover, owing to the provision of protrusions 22 and recesses 21, the surfaces 18, 19 of the race 14 and sleeve 15 adjacent the resilient member 16 need not be curved and may equally be planar.

In the embodiment of the bearing assembly 10 described above and illustrated in FIG. 2, the surfaces of the resilient member 16 adjacent the race 14 and sleeve 15 are free of any recesses 21 and protrusions 22. However, as will now be demonstrated with reference to FIG. 3, recesses 21 and protrusions 22 may equally be formed in the surfaces of the resilient member 16.

FIG. 3 illustrates an alternative embodiment of bearing assembly 10 in accordance with the present invention. Once again, the bearing assembly 10 comprises a housing 11 within which a ball 12 is housed and rotatably mounted. However, unlike the embodiment of FIG. 2 in which the ball 12 is a complete sphere, the ball 12 is only a partial sphere. Moreover, the ball 12 is completely housed within the housing 11, rather than partially housed as in the embodiment of FIG. 2.

The ball 12 is connected to a single arm 13 which extends away from the housing 11. Again, the arm 13 may be provided, for example, with a thread 26 or bore 27.

The surfaces 18, 19 of the race 14 and sleeve 15 adjacent the resilient member 16 are planar, i.e. having no curvature. However, one or both of the surfaces 18, 19 may equally be curved. Moreover, the curvature or ellipticity of the surfaces 18, 19 may differ from one another. For example, the curvature of the outermost surface 18 of the race 14 may be spherical (i.e. having an ellipticity of zero) whilst the curvature of the innermost surface 19 of the sleeve 15 may be spheroidal (i.e. having a non-zero ellipticity).

The resilient member 16 is bonded to the outermost surface 18 of the race 14 and is preferably bonded to the innermost surface 19 of the sleeve 15. However, as is described below, the adjacent surfaces 18, 24 of the sleeve 15 and resilient member 16 have co-operating protrusions 22 and recesses 21 and therefore the resilient member 16 need not be bonded to the sleeve 15.

The outermost surface 18 of the race 14 and the adjacent surface 23 of the resilient member 16 are smooth, i.e. free of any protrusions or recesses. The innermost surface 19 of the sleeve 15, on the other hand, includes a pair of annular protrusions 22 which co-operate with a pair of annular recesses 21 (i.e. grooves) formed on the adjacent surface 24 of the resilient member 16. The pairs of recesses 21 and protrusions 22 once again co-operate such that the resilient member 16 is compressed whenever the race 14 and sleeve 15 are displaced relative to one another, either as a result of axial or rotational forces.

This design of bearing assembly 10 is particularly advantageous when the interface that is likely to shear, upon subjecting the bearing assembly 10 to repeated or excessive axial or rotational forces, is that between the sleeve 15 and the resilient member 16.

Figure 1:
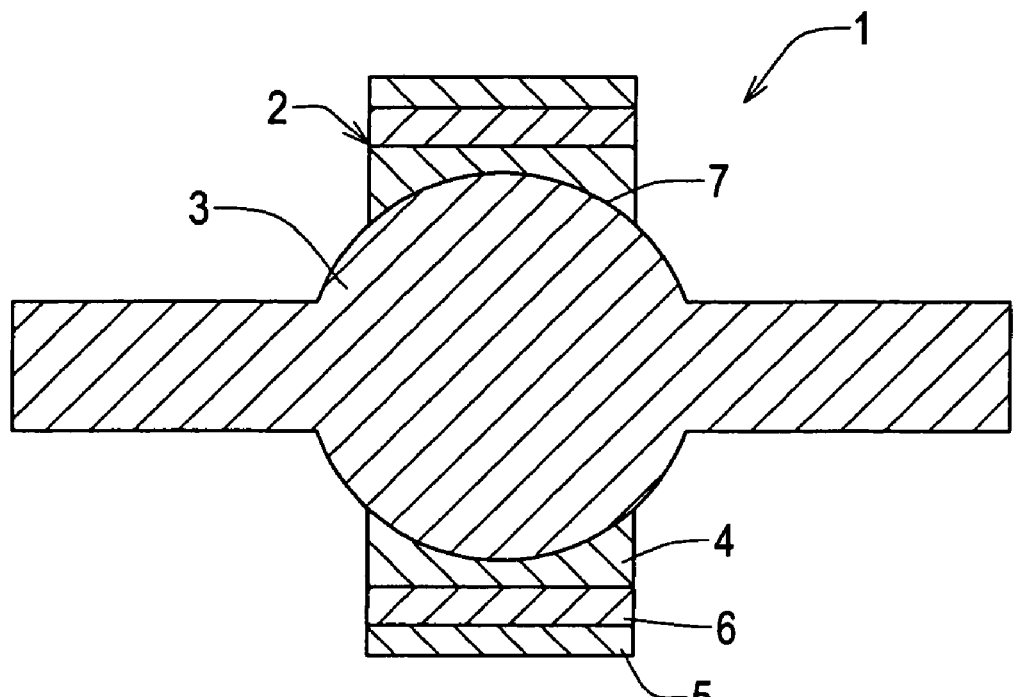
FIG. 1 is a cross-sectional view of a known bearing assembly.

The housing 2 of the spherical bearing 1 of FIG. 1 is generally manufactured by moulding the elastomer 6 directly onto the outermost surface of the race 4, applying an adhesive over the exposed surface of the elastomer 6 and then swaging the sleeve 5 onto the elastomer 6. As a result, the elastomer 6 is more securely bonded to the race 4 than to the sleeve 5. Any shearing of the bearing assembly 1 is therefore likely to occur at the interface of the sleeve 5 and elastomer 6. With the bearing assembly 10 of the present invention, on the other hand, the recesses 21 and protrusions 22 formed on the adjacent surfaces 19, 24 of the sleeve 15 and resilient member 16 co-operate to prevent, or at least significantly reduce the chances of, shearing at this interface.

It will, of course, be appreciated that recesses 21 and protrusions 22 may be additionally, or alternatively, formed on the outermost surface 18 of the race 14 and the surface 23 of resilient member 16 adjacent the race 14. Again, the recesses 21 and protrusions 22 may take on various forms, e.g. spirals, dimples/bumps, ripples.

With the bearing assembly 10 of the present invention, recesses 21 and protrusions 22 are provided on two or more adjacent surfaces 18, 19, 23, 24 of the race 14, sleeve 15 and resilient member 16. As a result, axial and/or rotational forces acting on the bearing assembly 10 are unlikely to result in the failure of the interfaces between the race 14 and resilient member 16 and between the sleeve 15 and resilient member 16. Nevertheless, there is a possibility that one or both of the interfaces may fail. Additionally, the bearing assembly 10 may suffer from a failure of the resilient member 16 itself. For example, the resilient member 16 may shear through the centre or tear at the protrusions 22 and/or recesses 21. A failure of the resilient member 16 or its interfaces could potentially result in the separation of the race 14 from the sleeve 15, and therefore the separation of the ball 12 from the housing 11.

In order to prevent the race 14 and sleeve 15 from separating upon failure of the resilient member 16 or its interfaces, the surfaces 18, 19 of the race 14 and sleeve 15 adjacent the resilient member 16 are preferably curved. Moreover, the sleeve 15 preferably extends along the race 14 in a direction parallel to the central axis of the housing 11 such that inner diameter of the sleeve 15 (i.e. the diameter of the innermost surface 19 of the sleeve 15) at the ends of the housing 11 is less than the outer diameter of the race 14 (i.e. the diameter of the outermost surface 18 of the race 14) at the centre or equator of the housing 11. Consequently, should either interface or the resilient member 16 fail, the race 14 is prevented from separating from the sleeve 15 in a direction parallel to the central axis of the housing 11.

Alternatively, or additionally, one of the surfaces 18, 19 of the race 14 and sleeve 15 adjacent the resilient member 16 (referred to hereafter as the first surface) includes at least one protrusion and the other surface 18, 19 of the race 14 and sleeve 15 (referred to hereafter as the second surface) includes at least one recess and/or protrusion which engages with the protrusion of the first surface upon failure of the resilient member 16. Engagement in this instance should be understood to mean that the protrusion of the first surface is prevented from passing the protrusion or recess of the second surface whenever the race 14 and sleeve 15 move relative to one another. Since the protrusion of the first surface is unable to pass the protrusion/recess of the second surface, the race 14 and sleeve 15 are prevented from separating.

Figure 4A:
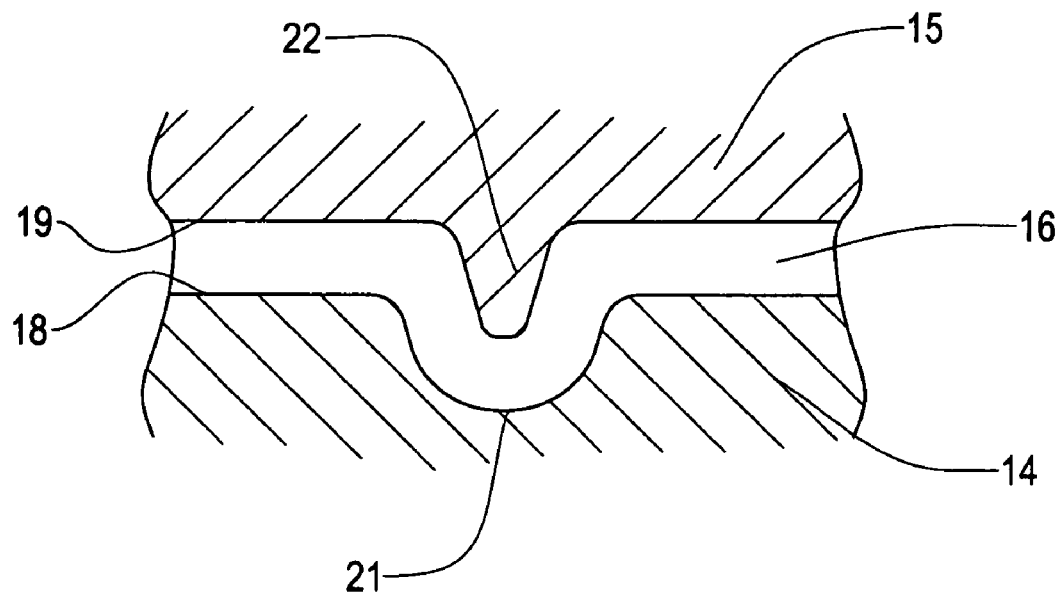
FIGS. 4a and 4b are exploded cross-sectional views of a region of the housing of bearing assemblies embodying the present invention.
Figure 4B:
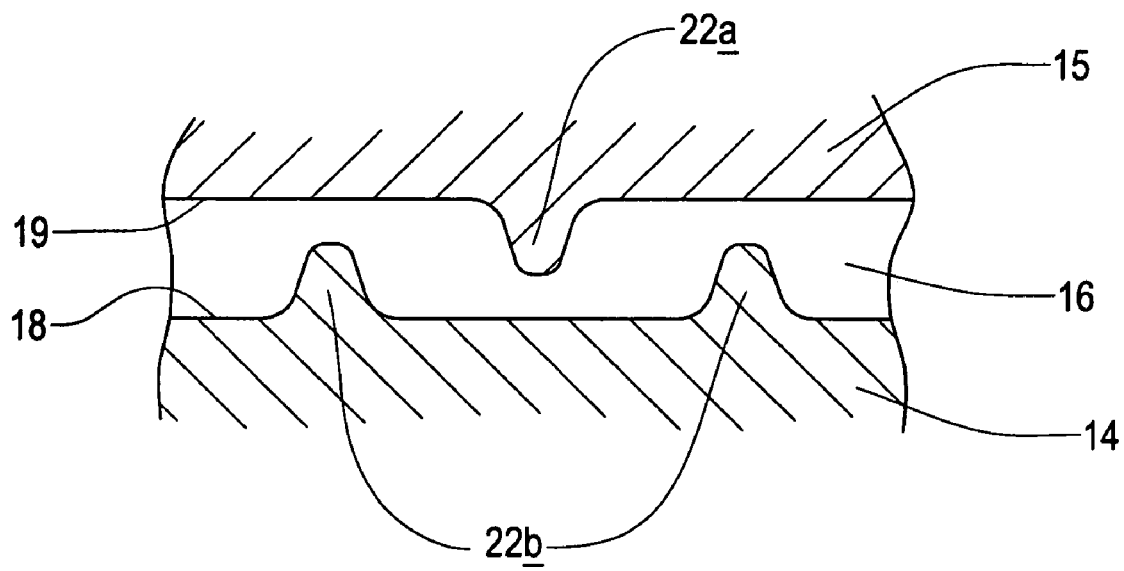

FIGS. 4a and 4b illustrate possible examples of recesses 21 and protrusions 22 formed on the surfaces 18, 19 of the race 14 and sleeve 15 which engage upon failure of the resilient member 16.

In FIG. 4a, a recess 21 is formed in the surface 18 of the race 14 and a co-operating protrusion 22 is formed on the surface of the sleeve 15. The resilient member 16 is of uniform thickness and is free of any recesses or protrusions. The depth of the recess 21 and height of the protrusion 22 are each greater than the thickness of the resilient member 16. Accordingly, the protrusion 22 is prevented from escaping the recess 21 should any failure of the resilient member 16 or its interfaces with the race 14 or sleeve 15 occur.

In FIG. 4b, a pair of protrusions 22a are formed on the surface 18 of the race 14, and a single protrusion 22b is formed on the surface 19 of the sleeve 15 at a position between the two protrusions 22a of the race 14. The resilient member 16 in this example includes three recesses 21, each recess 21 being formed at and co-operating with a protrusion 22a, 22b. The height of each protrusion 22a, 22b is greater than half the normal thickness of the resilient member 16. More precisely, the total height of any pair of engaging protrusions 22a, 22b is greater than the thickness of the resilient member 16. As a result, the single protrusion 22b of the sleeve 15 is prevented from passing either of the protrusions 22a of the race 14 upon failure of the resilient member 16 or its interfaces.

FIG. 5 illustrates a further embodiment of a bearing assembly 10 in accordance with the present invention. In this further embodiment, the ball 12 of the assembly 10 is an incomplete sphere housed entirely within the housing 11 and has a bore 20 through the centre for receiving a shaft, axle or the like. As with the embodiments of bearing assembly 10 illustrated in FIGS. 2 and 3, the ball 12 may alternatively be a complete sphere (or complete/partial spheroid) and may include one or more arms attached to the ball 12.

The outermost surface 18 of the race 14 is convex whilst the innermost surface 19 of the sleeve 15 is concave. The degree of curvature or ellipticity of the innermost surface 19 of the sleeve 15 is greater than that of the outermost surface 18 of the race 14, i.e. the surface 19 of the sleeve 15 is more concave than the surface 18 of the race is convex. As a result, the resilient member 16 is of non-uniform thickness and is thicker at the centre or equator of the housing 11 than at the ends of the housing 11.

In the embodiments of bearing assembly 10 illustrated in FIGS. 2 to 4, the outermost surface 18 of the race 14 and innermost surface 19 of the sleeve 15 have the same degree of curvature or ellipticity; a planar surface is one having no degree of curvature or an ellipticity equal to 1. As a result, the resilient member 16 may be regarded as having a uniform thickness. Even when the resilient member 16 includes one or more recesses or protrusions, the thickness of the resilient member 16 at all points free from protrusion or recess is constant. In contrast, the resilient member 16 of the bearing assembly 10 of FIG. 5 varies in thickness.

The surfaces 18, 19, 23, 24 of the race 14, sleeve 15 and resilient member 16 adjacent one another are preferably free of recesses 21 and protrusions 22. However, the surfaces 18, 19, 23, 24 may nevertheless be provided with one or more pairs of co-operating protrusions and recesses. In particular, one or more pairs of co-operating protrusions and recesses may be formed on the outermost surface 18 of the race 14 and the adjacent surface 23 of the resilient member 16.

This design of bearing assembly 10, like that of FIG. 3, is particularly advantageous when the interface that is likely to shear, upon subjecting the bearing assembly 10 to repeated or excessive axial or rotational forces, is that between the sleeve 15 and the resilient member 16. Owing to the concave shape of the surface 19 of the sleeve 15, any axial displacement of the race 14 relative to the sleeve 15 will cause the resilient member 16 to be compressed against the surface 19 of the sleeve 15. As a result, the race 14 and sleeve 15 are prevented form separating.

The curvature of the innermost surface 19 of the sleeve 15 is preferably non-spherical, i.e. having a non-zero ellipticity. Accordingly, any rotation of the race 14 relative to the sleeve 15 will cause the resilient member 16 to be compressed against the concave surface 19 of the sleeve 15; the only exception to this is when the race 14 and sleeve 15 rotate relative to one another about the central axis of the housing 11. Preferably, the innermost surface 19 of the sleeve 15 is oblate, and more preferably having an oblate ellipticity (sqrt $(1-(c/a)2)$ of between 0.80 and 0.97.

Although reference has been made to the innermost surface 19 of the sleeve 15 having a concave profile, it will be appreciated that the same technical effect is achieved in having a surface 19 that is convex. In this case, the resilient member 16 is thicker at the ends of the housing 11 that at the centre or equator of the housing 11.

The outermost surface 18 of the race 14 is preferably curved (convex or concave) such that the race 14 and sleeve 15 are additionally prevented from separating upon failure of the race:resilient member interface. Nevertheless, the surface 18 of the race 14 may alternatively be planar, particularly when the resilient member 16 is securely bonded to the race 14 (e.g. by directly moulding the resilient member 16 onto the race).

The specific embodiment illustrated in FIG. 5 is specifically designed at preventing failure of the bearing assembly 10 at the weaker sleeve:resilient member interface. It will of course be apparent that the profiles of the surfaces 18, 19 of the race 14 and sleeve 15 may be reversed should the weaker interface be that between the race 14 and the resilient member 16.

In all embodiments of the bearing assembly 10 described above, a lubricant or self-lubricating liner (not shown) may be provided between the ball 12 and the bearing surface 17 of the race 14 to reduce friction.

Figure 6:
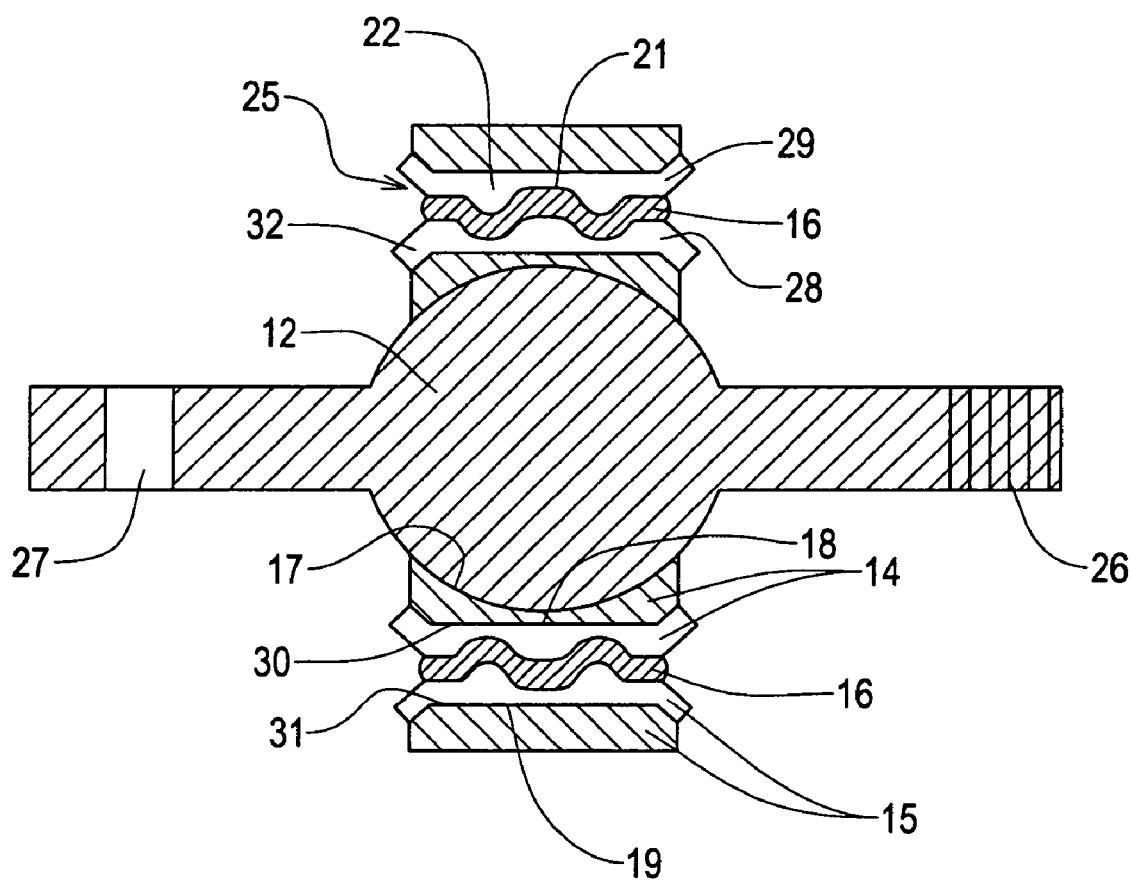
FIG. 6 is a cross-sectional view of a bearing assembly in accordance with a fourth embodiment of the present invention.

FIG. 6 illustrates a further embodiment of bearing assembly 10 in which the resilient member 16 is provided as part of an insert 25. The insert 25 comprises an inner cylindrical wall 28 and an outer cylindrical wall 29, which surrounds and is coaxial with the inner wall 28. The resilient member 16 is disposed between the inner 28 and outer 29 walls of the insert 25.

The insert 25 is inserted between the race 14 and the sleeve 15 during manufacture of the bearing assembly 10. Once inserted between the race 14 and the sleeve 15, the inner wall 28 of the insert 25 forms part of the race 14, and the outer wall 29 of the insert 25 forms part of the sleeve 15.

The innermost surface 30 of the inner wall 28 and the outermost surface 31 of the outer wall 29 are flat annular surfaces. Similarly, the outermost surface 18 of the race 14 and the innermost surface 19 of the sleeve are flat annular surfaces. Consequently, the insert 25 may be easily inserted between the race 14 and sleeve 15. The ends 32 of the inner 28 and outer 29 walls are deformable and are staked over the ends of the race 14 and the sleeve 15 after the insert 25 has been inserted such that the insert 25 is firmly retained between the race 14 and sleeve 15.

The surfaces of the inner 28 and outer 29 walls adjacent the resilient member 16 include pairs of co-operating recesses 21 and protrusions 22. As described above in relation to the embodiments of FIGS. 2 to 5, recesses and protrusions may be formed on any two or more surfaces selected from the surfaces of the resilient member 16 and the surfaces of the inner 28 and outer 29 walls adjacent the resilient member 16. Additionally, or alternatively, the surfaces of the inner 28 and outer 29 walls adjacent the resilient member 16 may have different curvatures such that resilient member is of non-uniform thickness.

A method of manufacturing the bearing assembly of FIGS. 2 to 5 will now be described. The bearing assembly 10 is preferably manufactured by first swaging the race 14 onto the ball 12. Any protrusions or recesses are then machined on the outermost surface 18 of the race 14. The resilient member 16 is then bonded onto the outermost surface 18 of the race 14. The resilient member 16 is preferably an elastomer moulded directly onto the outermost surface 18 of the race 14 by injection moulding. By moulding the resilient member 16 directly on the race 14, the resilient member 16 fills any recesses and surrounds any protrusions formed on the outermost surface 18 of the race 14. Any protrusions or recesses to be formed in the outermost surface 24 of the resilient member 16 are preferably formed in the moulding processes. The innermost surface 19 of the sleeve 15 is then machined to include any necessary protrusions or recesses. Finally, the sleeve 15 is swaged on to the resilient member 16. Prior to swaging the sleeve 15 on to the resilient member 16, a layer of adhesive is preferably applied between the sleeve 15 and resilient member 16 such that the resilient member 16 is bonded to the sleeve 15.

The elasticity of the bearing assembly 10 depends upon the degree by which the resilient member 16 is compressed between the race 14 and sleeve 15. Preferably, the resilient member 16 is compressed evenly, i.e. the degree of compression is the same at all points on the resilient member 16, such that the elasticity of the bearing assembly 10 is consistent. For those embodiments of bearing assembly 10 for which the resilient member 16 is of uniform thickness, the calculations required to compress the resilient member 16 evenly are much simpler. In particular, swaging the sleeve 15 onto the resilient member 16 to achieve even compression of the resilient member 16 is made much simpler.

Rather than moulding the resilient member 16 onto the race 14 and then swaging the sleeve 15 onto the resilient member 16, the sleeve 15 may first be positioned about the race 14 and then the resilient member 16 moulded between the race 14 and sleeve 15. In this manner, the resilient member 16 is directly bonded to both the race 14 and sleeve 15.

It will, of course, be appreciated that other methods conventionally employed in the manufacture of bearing assemblies may alternatively or additionally be used in the manufacture of the bearing assembly of the present invention, and that the process described above is provided by way of example only. For example, the resilient member 16 may be moulded in a separate process and then pulled over the outermost surface 18 of the race 14. Additionally, the housing 11 may be formed as a separate element and then swaged onto the ball 12.

With the bearing assembly of the present invention, axial and rotational forces are absorbed and dampened more effectively than is possible with known spherical bearings. In particular, the bearing assembly is able to resist axial and rotational forces which would otherwise cause the elastomer interfaces of known spherical bearings to shear.

When used in this Specification and Claims, the terms "comprises" and "comprising" and variations thereof mean that the specified features, steps or integers are included. The terms are not to be interpreted to exclude the presence of other features, steps or components.

The features disclosed in the foregoing description, or the following Claims, or the accompanying drawings, expressed in their specific forms or in terms of a means for performing the disclosed function, or a method or process for attaining the disclosed result, as appropriate, may, separately, or in any combination of such features, be utilised for realising the invention in diverse forms thereof.

From the foregoing, it will be appreciated that specific embodiments of the invention have been described herein for purposes of illustration, but that various modifications may be made without deviating from the spirit and scope of the invention. Accordingly, the invention is not limited except as by the appended claims.

We claim:

1. A bearing assembly comprising a housing and a ball at least partially housed within the housing and having an axis of rotation, the housing comprising a race having a concave bearing surface and receiving at least a portion of the ball, a sleeve surrounding the race, and a resilient member disposed between the race and the sleeve, the ball being rotatable relative to the race, wherein the surfaces of the race and sleeve adjacent the resilient member and the surfaces of the resilient member include at least one pair of a co-operating protrusion and recess in a direction generally parallel the axis of rotation.

2. A bearing assembly as claimed in claim 1, wherein the at least one protrusion and recess co-operate such that at least a portion of the resilient member is compressed upon rotating the race relative to the sleeve.

3. A bearing assembly as claimed in claim 2, wherein the race and sleeve are arranged coaxially about the axis of rotation and the at least one protrusion and recess co-operate such that at least a portion of the resilient member is compressed upon rotating the race relative to the sleeve about the axis of rotation.

4. A bearing assembly as claimed in claim 1, wherein at least one co-operating protrusion and recess are annular.

5. A bearing assembly as claimed in claim 1, wherein each protrusion and recess has a curved profile.

6. A bearing assembly as claimed in claim 1, wherein the resilient member is of uniform thickness and the surface of the race adjacent the resilient member includes one or more protrusions and recesses and the surface of the sleeve adjacent the resilient member includes one or more co-operating recesses or protrusions.

7. A bearing assembly as claimed in claim 1, wherein the surfaces of the race and sleeve adjacent the resilient member are respectively convex and concave.

8. A bearing assembly as claimed in claim 1, wherein the surfaces of the race and sleeve adjacent the resilient member have different curvatures.

9. A bearing assembly as claimed in claim 1, wherein at least one of the surfaces of the race and sleeve adjacent the resilient member is rippled.

10. A bearing assembly as claimed in claim 1, wherein the surfaces of the race and sleeve adjacent the resilient member include at least one pair of a protrusion and protrusion or protrusion and recess which engage with one another upon displacement of the race relative to the sleeve so as to prevent any further displacement of the race relative to the sleeve.

11. A bearing assembly as claimed in claim 1, wherein the ball and the bearing surface of the race are spherical.

12. A bearing assembly as claimed in claim 1, wherein the ball includes one or more arms.

13. A bearing assembly as claimed in claim 1, wherein the ball includes a bore.

14. A bearing assembly as claimed in claim 1, wherein a self-lubricating liner is provided between the race and the ball.

15. A bearing assembly, comprising:
a housing having a race, a sleeve surrounding the race, and a resilient member disposed between the race and the sleeve, the resilient member having a first surface in direct contact with the race and a second surface in direct contact with the sleeve;
a ball at least partially received in the race of the housing, the ball being rotatable relative to the race about a central axis of rotation; and
wherein the first and second surfaces of the resilient member include at least one pair of a co-operating protrusion and recess in a direction generally parallel the central axis of rotation.

16. A bearing assembly as claimed in claim 15, wherein the first and second surfaces of the resilient member are respectively convex and concave.

17. A bearing assembly as claimed in claim 15, wherein at least one of the first and second surfaces of the resilient member has a non-spherical curvature.

18. A bearing assembly as claimed in claim 15, wherein the resilient member has a thickness that is non-uniform.

19. A bearing assembly as claimed in claim 15, wherein the resilient member has a first thickness at a centre region of the housing and a second thickness proximate a peripheral region of the housing, the first thickness being greater than the second thickness.

20. A bearing assembly as claimed in claim 15, wherein the resilient member has a first thickness at a centre region of the housing and a second thickness proximate a peripheral region of the housing, the first thickness being smaller than the second thickness.

21. A bearing assembly as claimed in claim 15, wherein a surface of the race and a surface of the sleeve adjacent the resilient member include at least one pair of a co-operating protrusion and recess in the direction generally parallel the central axis of rotation.

22. A bearing assembly as claimed in claim 15, wherein the ball is spherical.

23. A bearing assembly as claimed in claim 15, wherein the ball includes one or more arms.

24. A bearing assembly as claimed in claim 15, wherein the ball includes a bore.

25. A bearing assembly as claimed in claim 15, further comprising a self-lubricating liner between the race and ball.

* * * * *

UNITED STATES PATENT AND TRADEMARK OFFICE
CERTIFICATE OF CORRECTION

PATENT NO. : 7,658,546 B2  Page 1 of 1
APPLICATION NO. : 11/243414
DATED : February 9, 2010
INVENTOR(S) : Clarke et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1081 days.

Signed and Sealed this

Twenty-eighth Day of December, 2010

David J. Kappos
*Director of the United States Patent and Trademark Office*